(12) United States Patent
Tanaka et al.

(10) Patent No.: US 7,217,384 B2
(45) Date of Patent: May 15, 2007

(54) DEVICE AND METHOD FOR RUNNER-LESS MOLDING OF THERMOSETTING RESIN AND RUBBER

(75) Inventors: Yoshiaki Tanaka, Yonezawa (JP); Masaaki Yoshida, Yonezawa (JP)

(73) Assignee: Seiki Corporation, Yonezawa-shi, Yamagata (JP)

( * ) Notice: Subject to any disclaimer, the term of this patent is extended or adjusted under 35 U.S.C. 154(b) by 499 days.

(21) Appl. No.: 10/490,650

(22) PCT Filed: Oct. 1, 2002

(86) PCT No.: PCT/JP02/10234

§ 371 (c)(1),
(2), (4) Date: Mar. 25, 2004

(87) PCT Pub. No.: WO03/101703

PCT Pub. Date: Dec. 11, 2003

(65) Prior Publication Data

US 2004/0247738 A1 Dec. 9, 2004

(30) Foreign Application Priority Data

Jun. 4, 2002 (JP) .............................. 2002-162871

(51) Int. Cl.
*B29C 45/72* (2006.01)
(52) U.S. Cl. .............................. 264/328.8; 264/328.15; 425/543; 425/549; 425/572
(58) Field of Classification Search ............. 264/328.2, 264/328.15, 328.6, 328.8; 425/543, 564, 425/570, 572–574, 548, 549
See application file for complete search history.

(56) References Cited

U.S. PATENT DOCUMENTS 3,780,764 A * 12/1973 Geist .......................... 425/564

4,004,871 A * 1/1977 Hardy ........................ 425/548

(Continued)

FOREIGN PATENT DOCUMENTS

JP        63-141714 U        9/1988

(Continued)

*Primary Examiner*—Jill L. Heitbrink
(74) *Attorney, Agent, or Firm*—James Creighton Wray (57) ABSTRACT

A runner-less molding device for thermosetting resins and rubbers, characterized by a movable runner bush (15), through which an uncured or unvulcanized fluid material kept at a low temperature supplied from a pouring nozzle (31) can flow, is slidably arranged in a temperature controlling bush (13) communicating with a gate (4) of a cavity (1); an insulation space (A) is formed by moving the movable runner bush (15) apart from the gate (4) during heating; a valve pin (18) is movably inserted into said movable runner bush (15); and the valve pin (18) is arranged so as to open and close the gate (4) in accordance with a pouring operation of the fluid material. A runner part of the movable runner bush containing molding material is constituted so as to move forward/backward relative to the cavity for preventing heat from conducting from the cavity, which is kept at a molding temperature, to the runner positioned apart from the gate for a long time, so that material loss generated in a sprue runner is reduced to almost null in order to reduce fabricating costs after molding and amount of wastes generated during after treatments. Thus, the improved molding device for the thermosetting resin and the rubber is obtained, and burdens on the global environment are alleviated.

10 Claims, 7 Drawing Sheets

U.S. PATENT DOCUMENTS

| | | | | |
|---|---|---|---|---|
| 4,592,711 A | * | 6/1986 | Capy | 425/564 |
| 4,863,369 A | * | 9/1989 | Schad et al. | 425/547 |
| 5,470,219 A | * | 11/1995 | Yokoyama et al. | 425/144 |
| 5,492,467 A | * | 2/1996 | Hume et al. | 425/549 |

FOREIGN PATENT DOCUMENTS

| | | |
|---|---|---|
| JP | 06-106557 A | 4/1994 |
| JP | 06-106564 A | 4/1994 |
| JP | 09-201850 A | 8/1997 |

\* cited by examiner

DEVICE AND METHOD FOR RUNNER-LESS MOLDING OF THERMOSETTING RESIN AND RUBBER

This application claims the benefit of Japanese Application No. 2002-162871 filed Jun. 4, 2002 and PCT/JP02/10234 filed Oct. 1, 2002.

FIELD OF INVENTION

The present invention relates to a runner-less molding device and its method for thermosetting resins, rubbers and the like.

RELATED ART

In molding devices and methods for thermosetting resins and rubbers, it is required to keep and control sprue runners at lower temperatures in order to prevent the thermosetting resins from curing or rubbers from vulcanizing, which disclosed, for example, in Japanese laid open utility model No. 63-141714 and Japanese laid open patent Nos. 11-129289 and 2000-280293 as well-known arts.

In these conventional examples, complicated mold arrangements are required in order to prevent heat from conducting from a cavity, in which a fluid material at a molding temperature is filled, to runners as much as possible, but still problems to attain enough heat insulating effects remain unsolved.

The present invention is carried out in view of solving problems mentioned above in order to provide a molding method for thermosetting resins, rubbers and the like, such that a heat insulating space is formed between a cavity and a runner part by rendering the runner part containing a molding material movable forward/backward relative to the cavity so as to prevent heat from conducting from the cavity, which is kept at a molding temperature, to the runner part positioned apart from a gate for a long period. As a result, material loss generated in a sprue runner is reduced to almost null so that finishing costs after molding and amount of wastes generated during finishing treatments can be reduced. Thus, the molding method for the thermosetting resin, the rubber and the like is improved, and burdens on the global environment are alleviated.

DISCLOSURE OF THE INVENTION

Hereinafter, technical substance of the present invention is disclosed.

(1) A runner-less molding device for thermosetting resins and rubbers, comprising: a pouring nozzle capable of pouring a thermosetting resin or a rubber kept at a low temperature in order not to be cured or vulcanized; a movable runner bush, capable of keeping a fluid material supplied from the pouring nozzle in an uncured or unvulcanized state; a cylindrical temperature controlling bush which holds the movable runner bush and a cavity communicating with a center hole formed at the tip of the movable runner bush being moved in the temperature controlling bush via gate, and further comprising; a valve pin movably inserted into the movable runner bush so as to open and close the gate, wherein: the valve pin closes the gate when a material is filled in the cavity and heated; and a heat insulating space is formed in the temperature controlling bush in order to keep the material in the movable runner bush in a low temperature state, when the movable runner bush is separated apart from the gate.

(2) The runner-less molding device for thermosetting resins and rubbers, according to (1) wherein: a runner sliding mechanism for sliding the movable runner bush in the temperature controlling bush and a valve sliding mechanism for sliding the valve pin so as to open and close the gate are arranged separately.

(3) The runner-less molding device for thermosetting resins and rubbers, according to (1) wherein: one or more movable runners thorough which the valve pins pass are arranged; the fluid material can flow from a pouring nozzle to the cavity via a manifold; and temperature controlling bushes through which the movable runner bushes can be respectively inserted, are arranged corresponding numbers to the gates which are connected to one or more cavities for obtaining one or more molded products.

(4) The runner-less molding device for thermosetting resins and rubbers, according to either one of (1) to (3), wherein: the temperature controlling bush has one hole for holding one movable runner bush or a plurality of holes for holding a plurality of movable runner bushes in the temperature controlling bush.

(5) The runner-less molding device for thermosetting resins and rubbers, according to either one of (1) to (4), wherein: a heat insulating bush is attached to around a center hole formed at the tip of the movable runner bush.

(6) The runner-less molding device for thermosetting resins and rubbers, according to either one of (1) to (5), wherein: an opening for communicating a runner part of the movable runner bush with a runner part of the manifold is arranged at the runner part of the movable runner bush.

(7) The runner-less molding device for thermosetting resins and rubbers, according to either one of (1), (3) to (5), wherein: the heat insulating bush of the movable runner bush is formed so as to form an air gap between the heat insulating bush and a conical bottom bored in a cavity plate around an outer periphery of the gate when the heat insulating bush is fitted to the gate.

(8) The runner-less molding device for thermosetting resins and rubbers, according to either one of (1) to (7), wherein: an opening for communicating the runner part of the movable runner bush with the runner part of the manifold is arranged at a sleeve which fixes a base of the movable runner bush (9) A runner-less molding method capable of molding products continuously for thermosetting resins and rubbers which are kept in an uncured or unvulcanized fluid material at a lower temperature comprising the steps of: supplying the supplied fluid material into a movable runner bush; moving the movable runner bush in a cylindrical temperature controlling bush so as to contact to a gate of a cavity for bringing the gate in an "open" state; moving a valve pin forward for bringing the gate in a "closed" state immediately after pouring the fluid material in the movable runner bush into the cavity; moving the movable runner bush apart from the gate so as to form a heat insulating gap in the temperature controlling bush as the gate being kept in the "closed" state; heating the cavity for curing or vulcanizing the fluid material therein; taking out cured or vulcanized fluid material as a molded product; moving the valve pin backward for bringing the gate in an "open" state while taking out the molded product so as to return to the first step; and performing above-mentioned steps repeatedly.

(10) The runner-less molding method for thermosetting resins and rubbers according to (9), wherein: the fluid material is supplied to one or more movable runner bushes via a manifold; shapes of the valve pins and timings for opening or closing the respective gates are changed so as to attain a desired filling balance in the cavity to which a plurality of the gates are arranged.

BRIEF DESCRIPTION OF THE DRAWINGS

FIG. 1 is a cross-sectional view of a first embodiment of runner-less molding devices for thermosetting resins, rubbers and the like.

PREFERRED EMBODIMENT BY THE PRESENT INVENTION

The present inventions are explained in detail by referring to drawings.

Hereinafter the first embodiment is described.

The same reference numerals in respective drawings refer to the same members or portions of the molding devices. A reference numeral "1" is cavities formed between a cavity plate 2 of a mold and a core plate 3 of the other mold (not shown) depicted in a chain line. A reference numeral "4" is gates formed as openings on the cavity plate 2. A reference numeral "5" is enlarged cylindrical holes pierced in the cavity plate 2 around respective centers of the gates 4 and respective cylindrical holes 5 have conical bottoms 6. Reference numerals "7" and "8" are an insulation plate and a first back plate, which are fitted together to the cavity plate 2 and in which holes 9 and 10 are formed respectively so as to communicate with the cylindrical holes 5, but having smaller diameters than the cylindrical holes 5. A reference numeral "11" is recesses functioning as insulating spaces arranged at the bottoms of and around peripheries of the cylindrical holes 5. A reference numeral "13" is cylindrical temperature controlling bushes, which form gaps 12 around inner surfaces of the cylindrical holes 5 and pass through holes 9 and 10 of the insulation plate 7 and the first back plate 8. Heads of the bushes 13 are firmly fitted to a surface of a manifold (which will be explained later) by sleeves 13a Temperature controlling holes 14 constituted by air gaps are formed in the temperature controlling bushes 13.

A reference numeral "15" is movable runner bushes slidably fitted in the temperature controlling bushes 13. Conical heads 15a are formed at the tips of the movable runner bushes 15 so as to mate to the conical bottoms 6 via heat insulating bushes 16, so that annular air gaps 17 are formed independently from the gaps 12. Valve pins 18 are arranged along center axes of the movable runner bushes 15 and pass through center holes 19 of the movable runner bushes 15 and center holes 20 of the heat insulating bushes 16 in order to open/close the gates 4.

Runner parts 21 are formed in the movable runner bushes 15 and sleeves 13a so that a fluid material for molding can stay in the runner parts 21 before molding. The runner parts 21 communicate with a runner part 23 of a manifold 22 via openings 37 of the sleeves 13a which are firmly fitted to bases of the movable runner bushes 15. In the drawings the sleeves 13a and the movable runner bushes 15 are illustrated as independent members, but they can be formed as monolithic members. As a result, the openings 37 are formed on the monolithically formed runner bushes 15.

A reference numeral "24" is runner sliding mechanisms such as piston/cylinder mechanisms for moving the movable runner bushes 15 forward/backward. Cylinders 24a are fixed to a second back plate 26 arranged above a first back plate 8 via first spacer blocks 25 and tips of pistons 24b are fixed to the manifold 22 so that the movable bushes 15 are moved via the manifold 22.

A reference numeral "27" is valve sliding mechanisms such as piston/cylinder mechanisms for moving the valve pins 18 forward/backward. Cylinder 27a are fixed to an attaching plate 29 fixed to a molding device and arranged above the second back plate 26 via second spacer blocks 28. Tips of pistons 27b are fixed to valve pin moving plates 30 arranged at bases of the valve pins 18 and detachably fitted to the second back plate 26 so that the valve pins 18 are moved via the valve pin moving plates 30.

A reference numeral "31" is a material pour nozzle arranged on the fixed attaching plate 29. The material pour nozzle 31 is communicated with a movable supply hole 32 arranged on the runner part 23 of the manifold 22 and connected to the runner part 23.

In the drawings, a mold arrangement having the cavities 1 at two places for obtaining two molded products are illustrated, but cavities can be arranged more than three as well as a single cavity.

Further, in the drawings, only one movable runner bush 15 is arranged in one temperature controlling bush 13, but a plurality of movable runner bushes can be arranged in one enlarged temperature controlling bush having a plurality holes (corresponding to the gaps 12, the holes 5 and the holes 9, 10) in parallel.

A reference numeral "33" is temperature controlling holes pierced on the cavity plate 2, the first and second back plates 8, 26 and the manifold 22. These holes together with temperature controlling holes 14 are arranged in order to let water, oil or gas flow through so that the fluid material can be prevented from curing before the fluid material is treated in the cavities 1. A reference numeral "34" is heating means arranged in the cavity plate 2 for heating heaters, heating medium and the like in order to cure fluid material in the cavities 1. A reference numeral "35" is a sprue bush which constitutes the material pour nozzle 31. A locate ring 36 arranged around the sprue bush 35 is a positioning ring in order to fit material supply nozzles of various molding machines to the material pour nozzle 31 precisely and tightly.

Hereinafter based on the mold constitution described above, effects by the present invention, namely, steps of the molding method by the present invention are explained as referring to FIGS. 3A to 3D.

Figure 1:
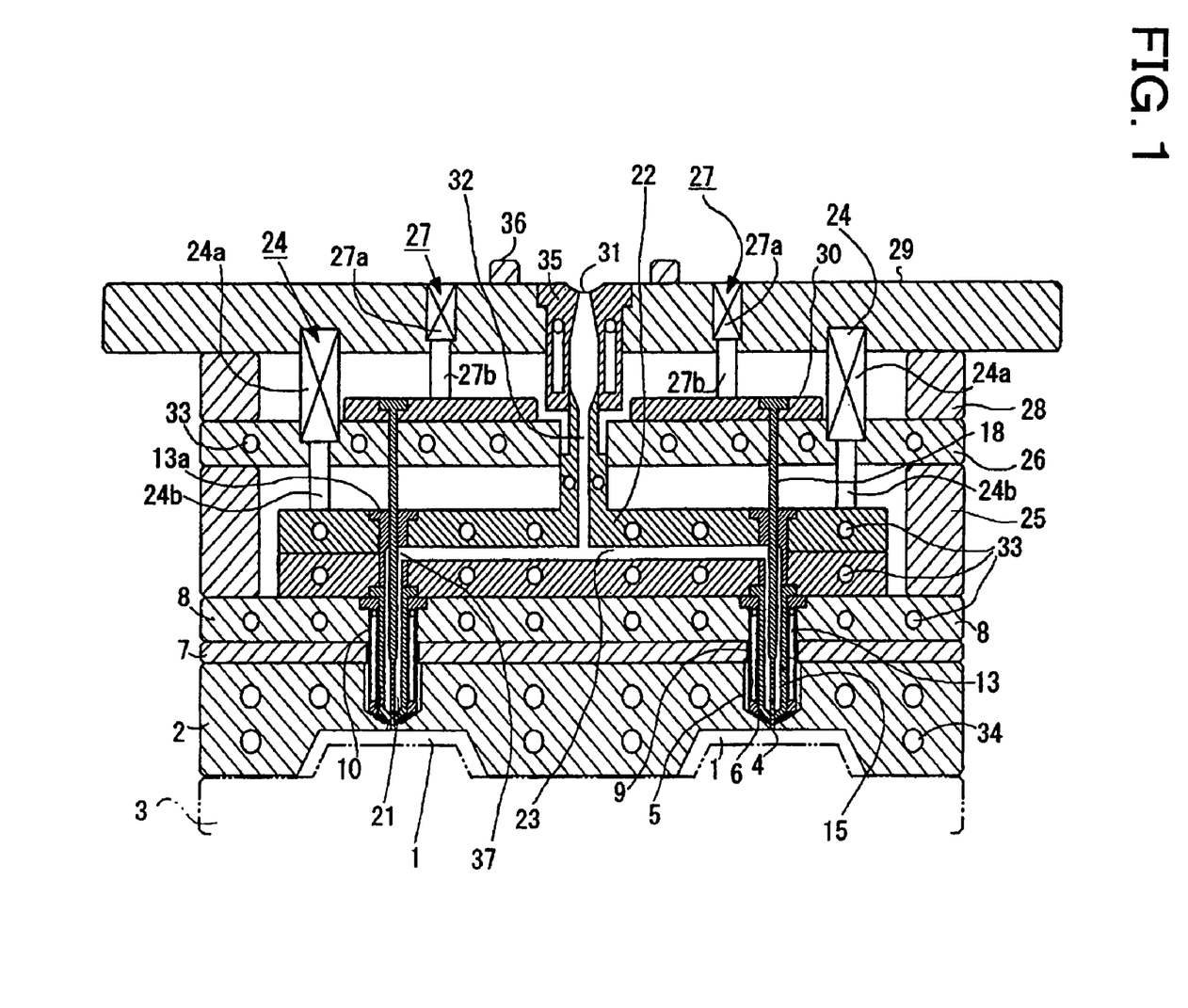
Figure 2:
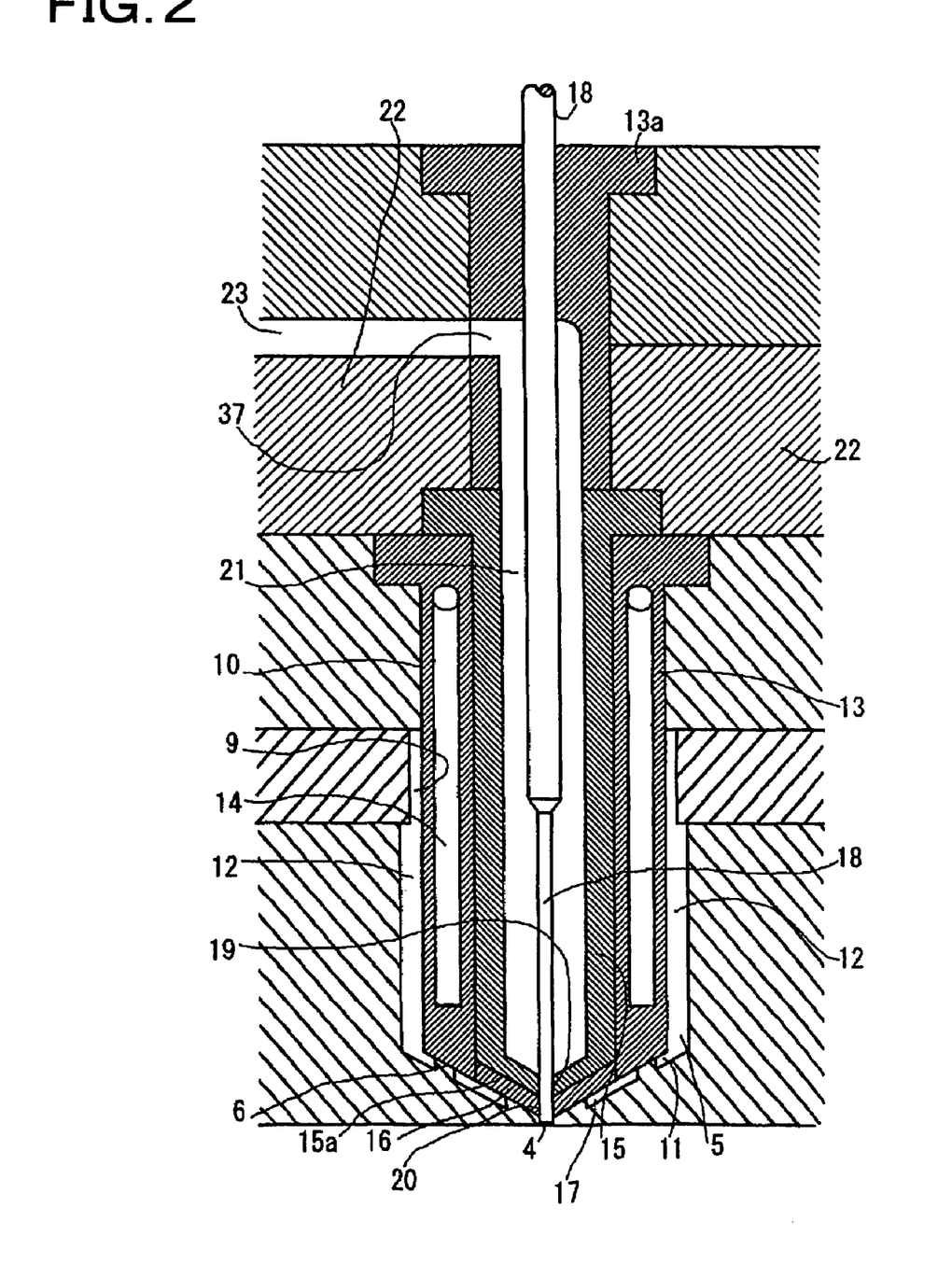
FIG. 2 is an enlarged cross-sectional view of the main portion of FIG. 1.
Figure 3A:
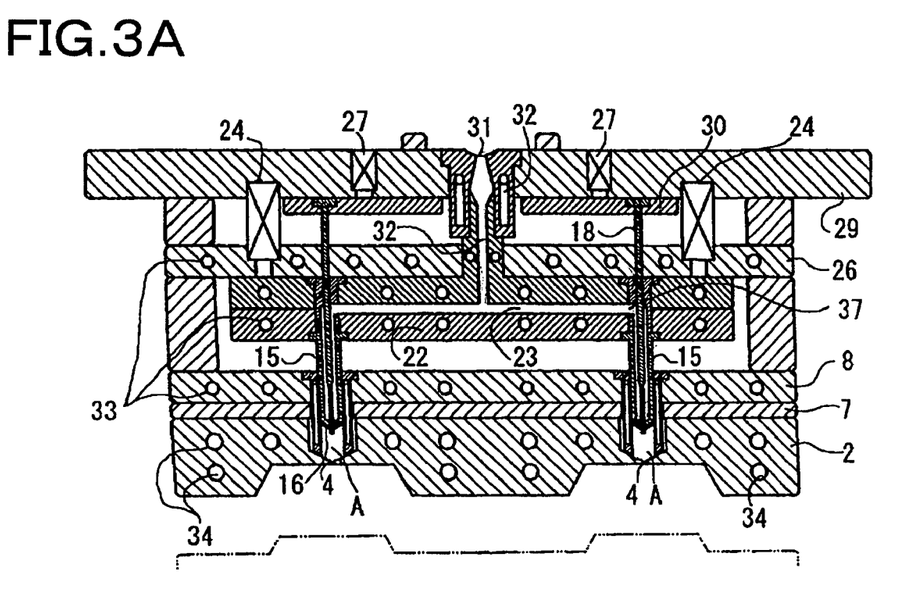
FIGS. 3A to 3D are cross-sectional views illustrating a cycle of molding steps of the first embodiment.

A specified thermosetting resin or rubber is melted in an uncured or unvulcanized fluid state and is supplied from the material pour nozzle 31 to the runner parts 21 of the movable runner bushes 15 via the runner part 23 of the manifold 22, and stays in the runner parts 21. In this stage, the valve pins 18 are passing through the center holes 19, 20 of the movable runner bushes 15 as shown in FIG. 3A.

In other words, the runner piston/cylinder mechanisms 24 and the valve piston/cylinder mechanisms 27 are kept inactive so that the movable core plate 3 is stayed at a backward position as shown in a chained line and the cavity 1 is kept in an opened and unmolded state.

Then the core plate 3 is moved forward and fitted to the cavity plate 2 fixed to the molding device so as to form the cavities 1. Simultaneously, the pistons 24b of the runner piston/cylinder mechanisms 24 is moved forward so that the movable runner bushes 15 are moved forward in the cylindrical temperature controlling bushes 13 and the conical heads 15a at the tips of the bushes 15 are fitted to the conical bottoms 6 via the dish-shaped insulating bushes 16. Consequently, the air gaps 17 are formed and the center holes 19 of the movable runner bushes 15 are communicated with the gates 4 of the cavities 1 via the center holes 20 (see FIG. 3B).

Figure 3B:
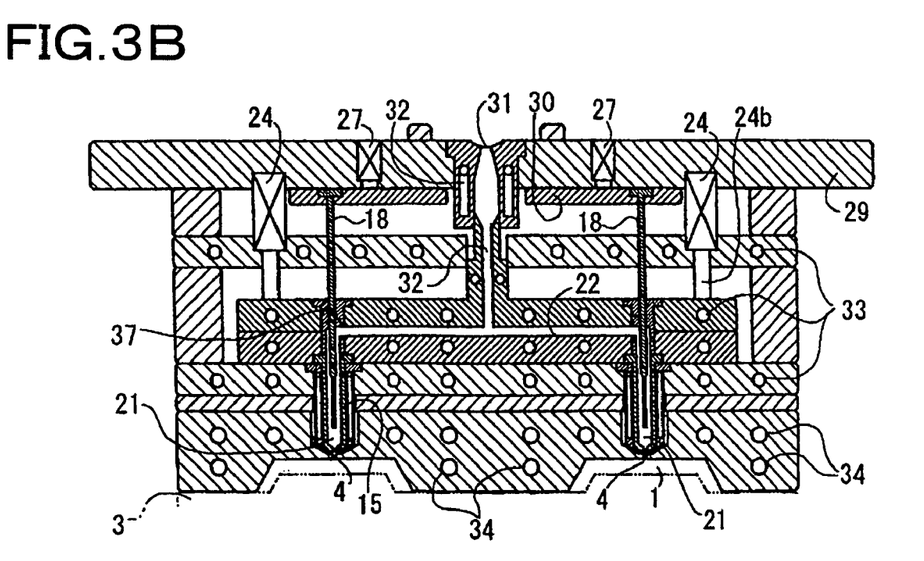

In the drawings, the air gaps 17 are formed between concave portions of the dish-shaped bottoms 6 and the conical heads 15a. However, if the concave portions are formed on the conical heads 15a instead, the gaps 17 can be formed in the same way (not shown in the drawings)

In this stage the valve pins 18 are not inserted in the gates 4 and are in a "gate open" state, which means fluid material can be poured, so that the fluid material staying in the runner part 23 of the manifold 22 and in the runner parts 21 of the movable runner bushes 15 can be filled in the cavities 1 by a required amount.

Figure 3C:
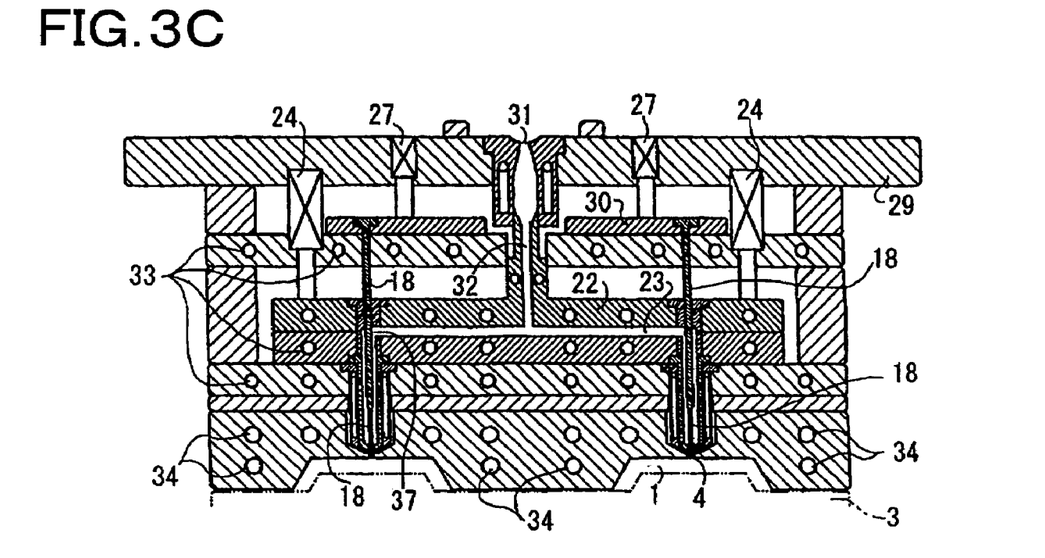

Immediately when a filling step of the fluid material in the cavities 1 is finished, the pistons 27b of the valve piston/cylinder mechanisms 27 are moved forward so that the valve pins 18 are moved forward via valve pin moving plate 30 and the tips of the valve pins 18 are inserted in the gates 4 via the central holes 19 of the movable runner bushes 15 and the central holes 20 of the dish-shaped insulating bushes 16 so that openings of the gates 4 are closed. In other words, the molding device is in the so-called "gate closed" state as illustrated in FIG. 3C.

Figure 3D:
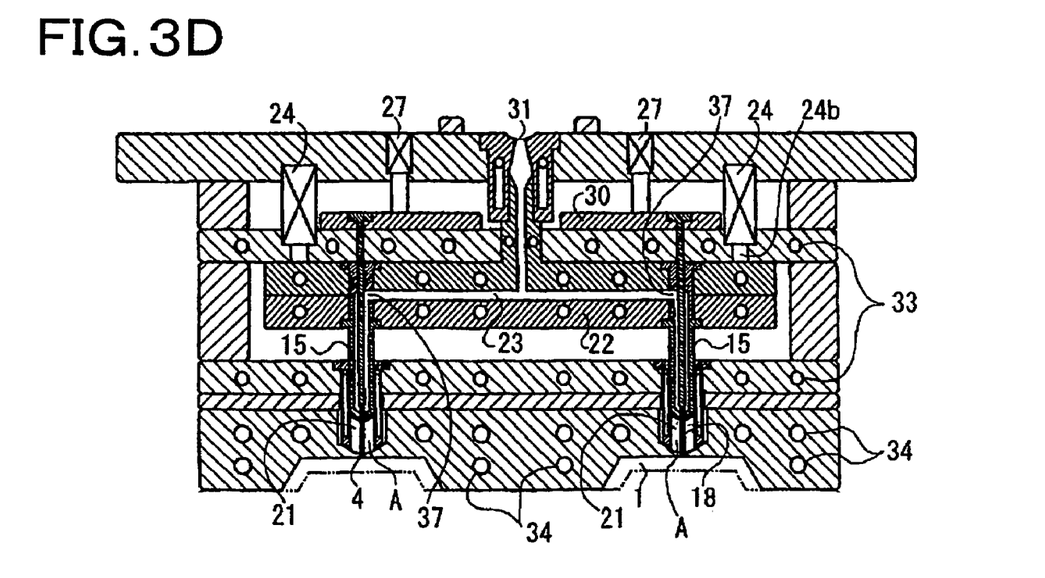

Immediately the movable runner bushes 15 are moved backward in the cylindrical temperature controlling bushes 13 by the movements of the pistons 24 of the runner piston/cylinder mechanisms 24 so that the movable runner bushes 15 are positioned sufficiently apart from the gates 4 as illustrated in FIG. 3D and spaces, namely, insulating spaces A are formed in the cylindrical temperature controlling bushes 13 between the tips of the movable runner bushes 15 and the gates 4.

In this state, uncured thermosetting resin or unvulcanized rubber filled in the cavities 1 are heated for curing and molding by heating means 34 such as heaters and the like. Cured molded products are taken out of the cavities 1 by utilizing ordinary methods after the core plate 3 is moved apart from the cavity plate 2. The valve pins 18 can be moved backward by moving the valve piston/cylinder mechanisms 27 any desired time during a curing period, from a cure initiation time to a cure completion time. Thus the molding device returns to the state illustrated in FIG. 3A.

One molding cycle is finished as described above. A lot of the molded products with the same shape can be manufactured on a mass scale, when the molding cycles are operated repeatedly.

Followed by the first embodiment described above, the second embodiment having a different arrangement in runner sliding mechanisms and valve driving mechanisms from the first embodiment is explained as referring to FIG. 4 and FIGS. 5A to 5D.

In these drawings the same reference numerals are assigned to the same members as the first embodiment, so that detailed explanations on these members are omitted.

Figure 4:
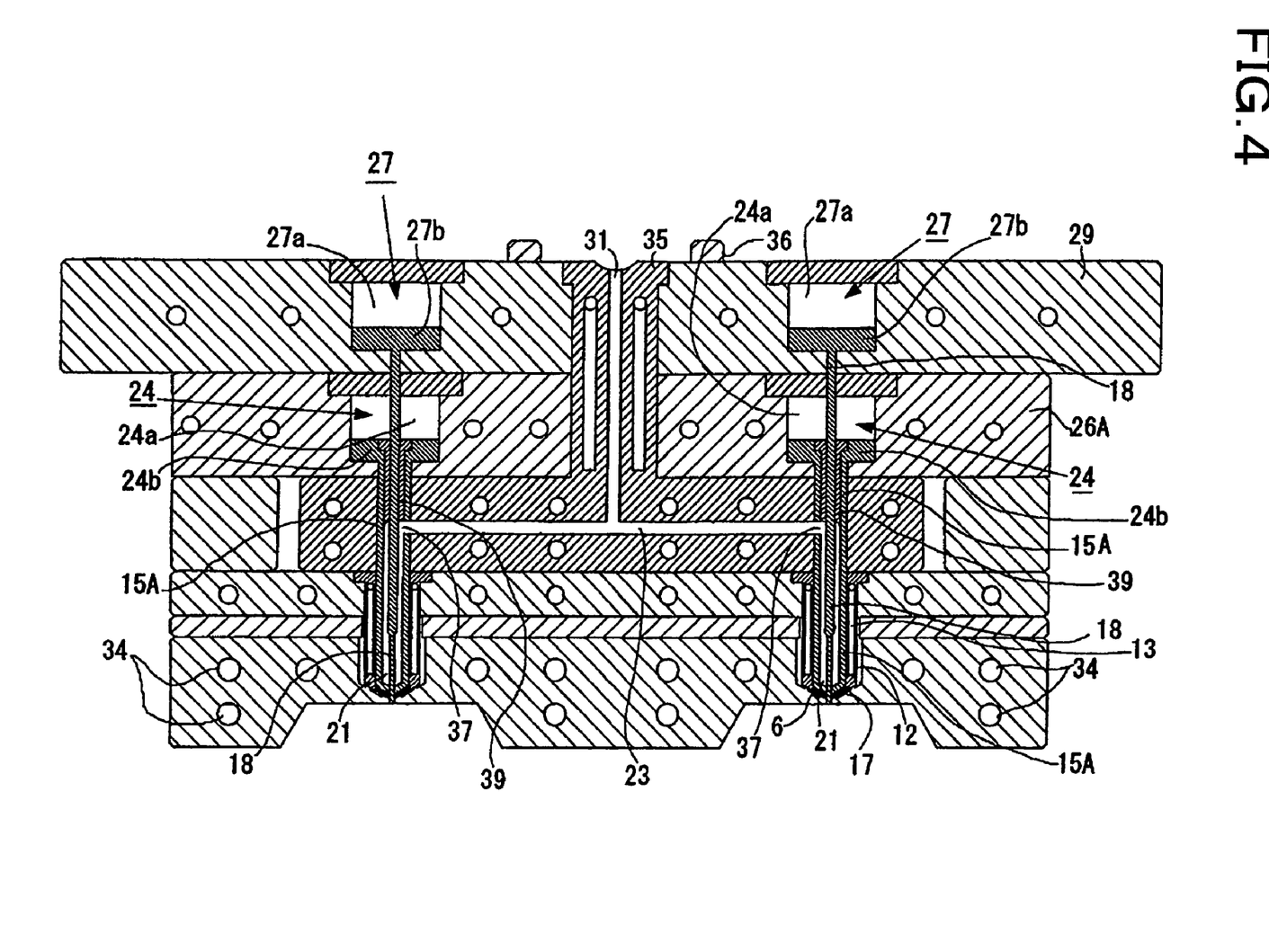
FIG. 4 is a cross-sectional view of a second embodiment of runner-less molding devices.

In the second embodiment, the valve pins 18 fixed to the tips of the pistons 27b of the piston/cylinder mechanisms 27 which correspond to the valve sliding mechanisms in the first embodiment, are slidably pass through along the center axe of the piston/cylinder mechanisms 24 which correspond to the runner sliding mechanisms in the first embodiment. Cylinders 24a and pistons 24b of the piston/cylinder mechanisms 24 are arranged in a cylinder plate 26A in place of the second back plate 26 of the first embodiment, and cylinders 27a and pistons 27b of the piston/cylinder mechanisms 27 are arranged in the fixed attaching plate 29 arranged next to the cylinder plate 26A.

The pistons 24b of the runner piston/cylinder mechanisms 24 are directly connected to the bases of movable runner bushes 15A and pipes 39 for passing/sliding through the above-mentioned valve pins 18 are arranged along the axe of the valve pins 18.

The opening 37 communicating with runner parts 21 of the movable runner bushes 15A and the runner part 23 of the manifold 22, can be formed as an elongated opening in a sliding direction of the movable runner bushes 15A, when an uncured resin or an unvulcanized rubber is always allowed to communicate with the runner parts 21 of the movable runner bushes 15A. In this case, the runner part 23 of the manifold 22 can be communicated with the runner parts 21 of the movable runner bushes 15A via the elongated opening 37, wherever the movable bushes 15A are positioned (not shown in the drawings).

Molding steps of the second embodiment constituted in the above-mentioned way, are shown in FIGS. 5A to 5D which correspond to FIGS. 3A to 3D of the first embodiment. Basically a molding procedure of the second embodiment is the same as the molding procedure of the first embodiment.

Therefore the molding steps are explained briefly hereinafter. One molding cycle is performed as follows: the uncured or unvulcanized fluid material is transferred from a stand-by state as shown in FIG. 5A to a pouring initiation state as shown in FIG. 5B; then a pouring step is completed as shown in FIG. 5C; then, a thermosetting or vulcanizing step of the poured fluid material, by bringing gate in a "closed" state as shown in FIG. 5D; finally a step for taking molded products out of the cavities by moving valve pins 18 backward for returning to the initial state as shown in FIG. 5A; thus one molding cycle is finished.

Figure 5A:
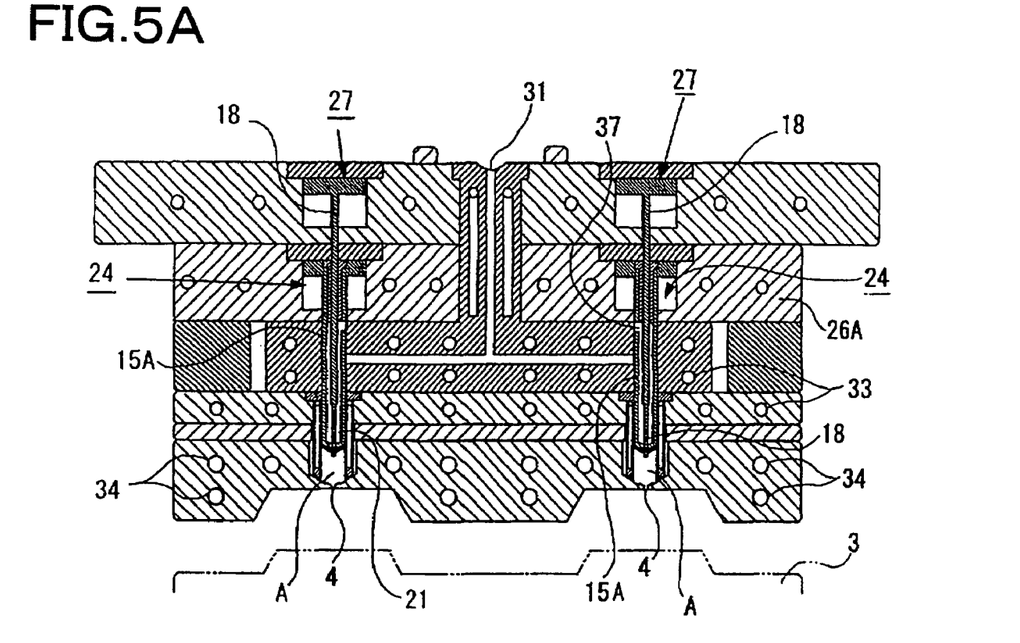
FIGS. 5A to 5D are cross-sectional views illustrating a cycle of molding steps of the second embodiment.
Figure 5B:
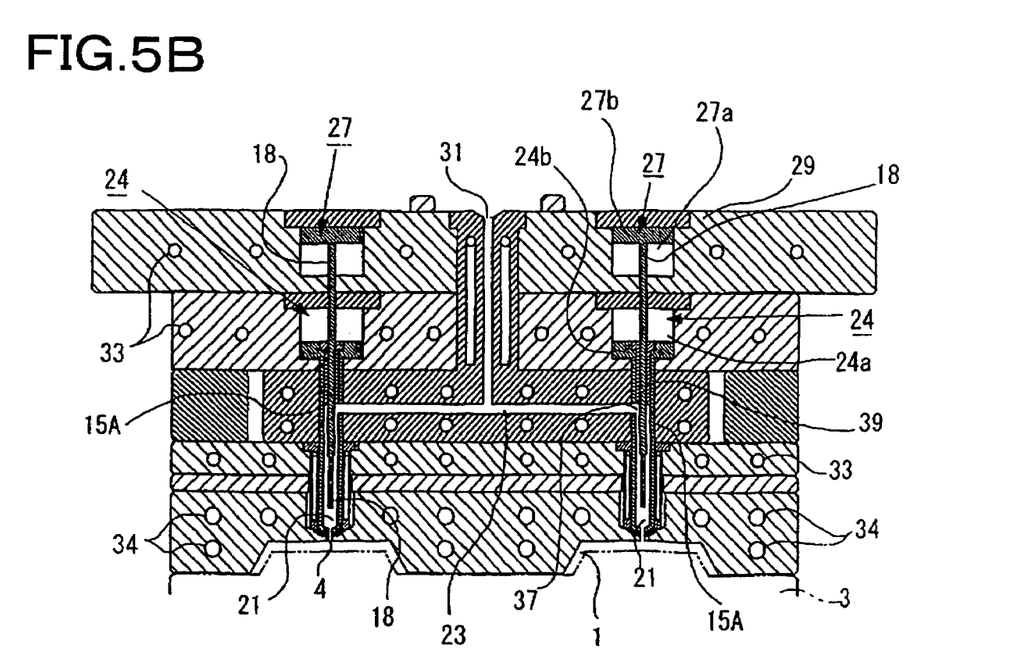
Figure 5C:
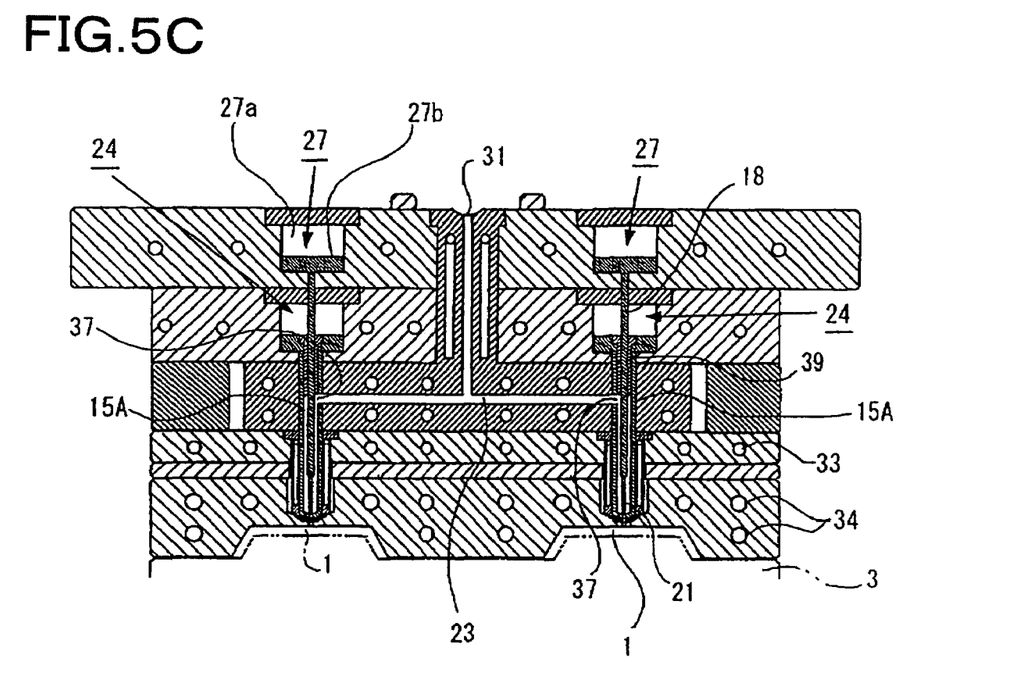
Figure 5D:
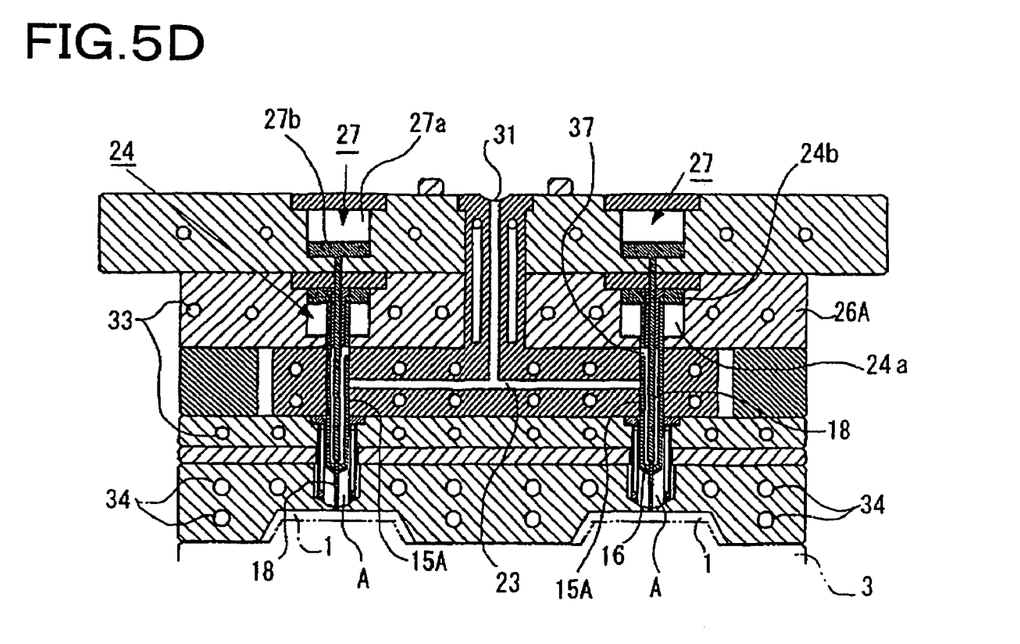

The openings 37 of the movable runner bushes 15A do not communicate with the runner part 23 of the manifold 22 in molding steps shown in FIGS. 5A and 5D.

The above-mentioned embodiments relate to molding methods for obtaining a plurality of molded products by utilizing a manifold and a plurality of gates and cavities. However, it is possible to employ a molding method for obtaining one large molded product by utilizing one cavity to which a plurality of gates are connected. In such a case, filling amounts of fluid material from the gates to the cavity can be controlled as desired, if shapes of the respective valve pins are changed in various ways and when timings to open and/or close the gates are changed by moving respective piston/cylinder mechanisms in order to drive the valve pins in various ways.

Since open/close systems by the valve pins are equipped in the molding device by the present invention, gate diameters can be determined from a large one to a small one in accordance with sizes of the gates. In a large diameter, since a filling pressure of the fluid material is alleviated and a required power is reduced, a pressure drop in the cavity is expedited which leads to reduction in mechanical stress in the molded product, consequently, which is useful to prevent generating defective molded products. Further, a time required to fill the fluid material into the cavity is reduced, in other words, a pouring rate of an injection molding is improved, when such gate with the large diameter is employed.

Thermosetting resins such as a urea resin, a phenolic resin, a melamine resin, a fran resin, an alkyd resin, an unsaturated polyester resin, a diallyl phthalate resin, an epoxy resin, a silicone resin, a polyurethane resin and the like can be employed in the molding devices by the present invention. And all rubbers such as a styrene-butadiene rubber, an ethylene-propylene rubber, an ethylene-propylene-dienepolymer-other butadiene rubber, a butadiene rubber, a high styrene rubber, an isoprene rubber, a butyl rubber, a halogenated butyl rubber, a hydrin rubber, a chlorinated polyethylene, an ethylene-acrylate rubber and the like.

The following features are attained by the present invention: the heat insulating spaces are formed by moving the movable runner bushes apart from the gate of the cavities, when the thermosetting resin or rubber filled in the cavities are heated up to a curing temperature or a heating temperature; fluid reins staying in the runner parts are not cured or vulcanized, since heat from the cavities to the runner parts containing the uncured or unvulcanized resins, is insulated due to temperature controlling effects by various fluids flowing through the temperature controlling holes formed respective members fixed to the molding device and due to air gaps so that fluid resins in the runner parts are not heated unexpectedly; since the gates of the cavities are opened/closed properly and securely by moving the valve pins forward/backward along the center axe of the movable runner bushes, droolings from the gates are prevented so that after treatments such as removing gate marks are not required and the sprue runners are completely prevented from generating.

POSSIBILITIES OF INDUSTRIAL USE

The sprue runners, which are usually generated in conventional injection moldings, compression moldings, transfer moldings and the like for molding thermosetting resins and rubbers, can be completely prevented from generating by the present invention. Further, the present invention can alleviate material loss, man-hours for after treatments and amount of the industrial waste so that the present invention brings economical effects in molding material costs, manufacturing costs, industrial wastes treating costs and the like and also brings effects of alleviating burdens to the global environment.

The invention claimed is:

1. A runner-less molding method capable of molding products continuously for thermosetting resins and rubbers which are kept in an uncured or unvulcanized fluid material at a lower temperature comprising the steps of:
   supplying a supplied fluid material into a movable runner bush;
   moving said movable runner bush in a cylindrical temperature controlling bush so as to contact a gate of a cavity for bringing said gate in an open state;
   moving a valve pin forward for bringing said gate in a closed state immediately after pouring the fluid material in said movable runner bush into said cavity;
   moving said movable runner bush apart from said gate so as to form a heat insulating gap in said temperature controlling bush as said gate being kept in the closed state;
   heating said cavity for curing or vulcanizing the fluid material therein;
   taking out cured or vulcanized fluid material as a molded product;
   moving said valve pin backward for bringing said gate in an open state while taking out the molded product so as to return to the first step; and
   performing the above-mentioned steps repeatedly.

2. The runner-less molding method for thermosetting resins and rubbers according to claim 1, wherein:
   the fluid material is supplied to one or more movable runner bushes via a manifold;
   shapes of said valve pins and timings for opening or closing said respective gates are changed so as to attain a desired filling balance in said cavity to which a plurality of said gates are arranged.

3. A runner-less molding device for thermosetting resins and rubbers, comprising:
   a pouring nozzle capable of pouring a thermosetting resin or a rubber kept at a low temperature in order not to be cured or vulcanized;
   a movable runner bush, capable of keeping a fluid material supplied from said pouring nozzle in an uncured or unvulcanized state;
   a cylindrical temperature controlling bush which holds said movable runner bush; and
   a cavity having a gate communicating with a center hole formed at the tip of said movable runner bush being moved in said temperature controlling bush, and further comprising;
   a valve pin movably inserted into said movable runner bush so as to open and close said gate, wherein:
   said valve pin closes said gate when a material is filled in said cavity and heated; and
   a heat insulating space is formed in said temperature controlling bush in order to keep the material in said movable runner bush in a low temperature state, when said movable runner bush is separated apart from said gate.

4. The runner-less molding device for thermosetting resins and rubbers, according to claim 3 wherein:
   a runner sliding mechanism for sliding said movable runner bush in said temperature controlling bush and a valve sliding mechanism for sliding said valve pin so as to open and close said gate are arranged separately.

5. The runner-less molding device for thermosetting resins and rubbers, according to claim 3 wherein:
   one or more said movable runner bush through which one or more said valve pins pass are arranged;
   wherein the fluid material can flow from the pouring nozzle to said cavity via a manifold; and
   said temperature controlling bushes through which said movable runner bushes can be respectively inserted, are arranged in corresponding numbers to said gates which are connected to one or more cavities for obtaining one or more molded products.

6. The runner-less molding device for thermosetting resins and rubbers, according to either claim 3, wherein:
   said temperature controlling bush has one hole for holding one movable runner bush or a plurality of holes for holding a plurality of movable runner bushes in said temperature controlling bush.

7. The runner-less molding device for thermosetting resins and rubbers, according to claim 3, wherein:
   a heat insulating bush is attached around the center hole formed at the tip of said movable runner bush.

8. The runner-less molding device for thermosetting resins and rubbers, according to claim 3, wherein:
   an opening for communicating a runner part of said movable runner bush with a runner part of said manifold is arranged at the runner part of said movable runner bush.

9. The runner-less molding device for thermosetting resins and rubbers, according to claim 3, wherein:

a heat insulating bush of said movable runner bush is formed so as to form an air gap between the heat insulating bush and a conical bottom bored in a cavity plate around an outer periphery of the gate when the heat insulating bush is fitted to the gate.

10. The runner-less molding device for thermosetting resins and rubbers, according to claim 3, wherein:

an opening for communicating the runner part of said movable runner bush with the runner part of said manifold is arranged at a sleeve which fixes a base of said movable runner bush.

* * * * *